United States Patent
Murayama et al.

[11] Patent Number: 6,118,295
[45] Date of Patent: Sep. 12, 2000

[54] POWER SUPPLY VOLTAGE DETECTION DEVICE

[75] Inventors: Shingo Murayama; Akira Futamata, both of Kanagawa, Japan

[73] Assignee: NEC Corporation, Tokyo, Japan

[21] Appl. No.: 09/060,827

[22] Filed: Apr. 16, 1998

[30] Foreign Application Priority Data

Apr. 16, 1997 [JP] Japan ................................ 9-099083

[51] Int. Cl.$^7$ ........................... G01R 31/40; G01R 27/28
[52] U.S. Cl. ........................ 324/771; 324/433; 324/618
[58] Field of Search ................... 324/771, 522, 324/618, 705, 677, 678, 713, 426, 433

[56] References Cited

U.S. PATENT DOCUMENTS

| 5,481,194 | 1/1996 | Schantz et al. | 324/522 |
| 5,805,068 | 9/1998 | Bradus | 340/636 |

FOREIGN PATENT DOCUMENTS

| 58-39419 | 9/1983 | Japan . |
| 60-250714 | 12/1985 | Japan . |
| 3-5634 | 1/1991 | Japan . |

*Primary Examiner*—Glenn W. Brown
*Attorney, Agent, or Firm*—Sughrue, Mion, Zinn, Macpeak & Seas, PLLC

[57] ABSTRACT

A power supply voltage detection device includes a reference voltage generating circuit, an integrator circuit, a lower limit comparator, and an upper limit comparator. The reference voltage generating circuit generates lower and upper limit reference voltages by resistance-dividing a power supply voltage. The integrator circuit integrates comparative voltages extracted by resistance-dividing the power supply voltage. The lower limit comparator compares the lower limit reference voltage from the reference voltage generating circuit with an output voltage from the integrator circuit to detect that the power supply voltage becomes equal to or lower than a lower limit. The upper limit comparator compares the upper reference voltage from the reference voltage generating circuit with an output voltage from the integrator circuit to detect that the power supply voltage becomes equal to or higher than an upper limit.

9 Claims, 5 Drawing Sheets

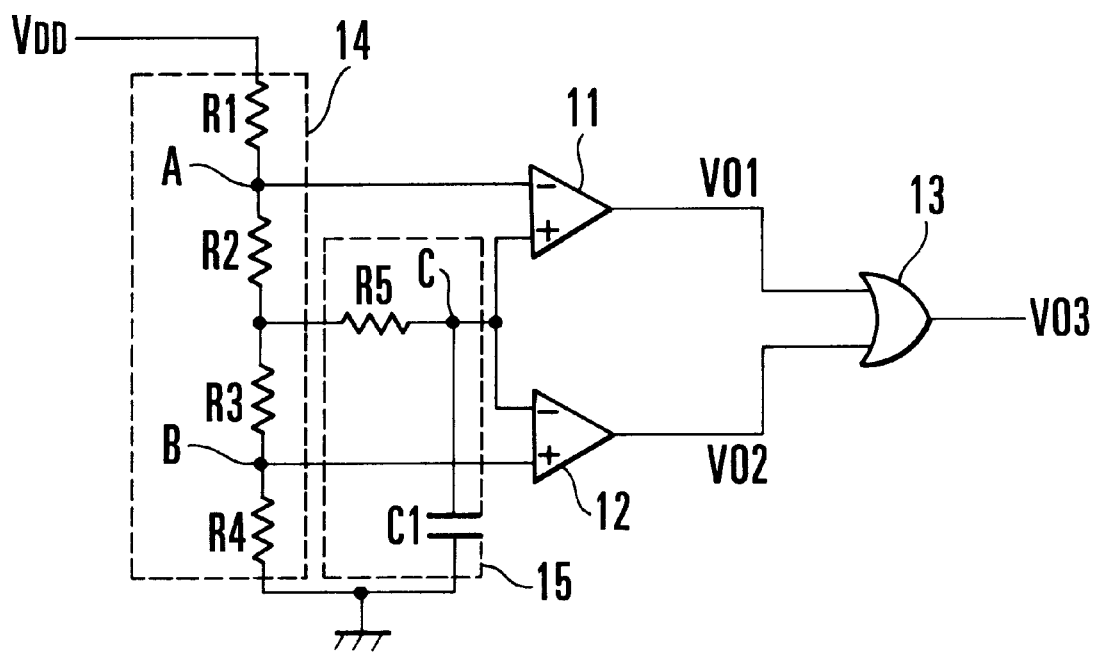
F I G. 1

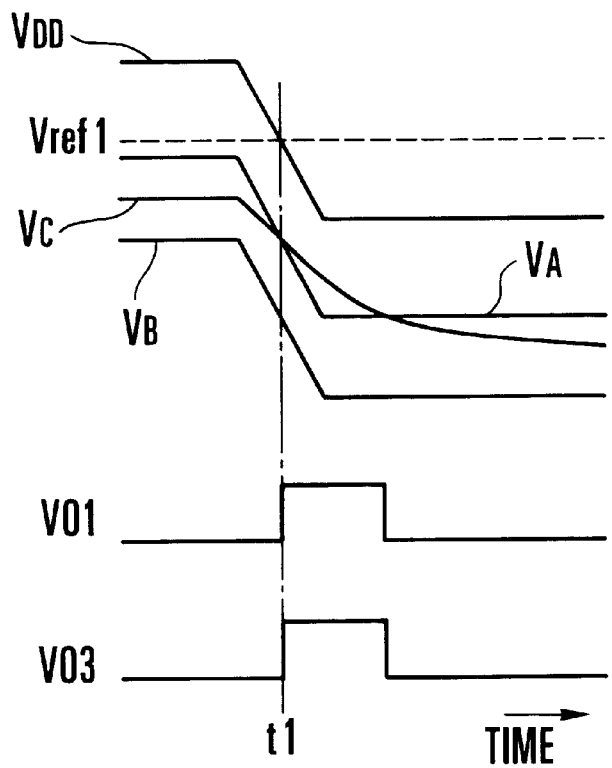
FIG. 2A
FIG. 2B
FIG. 2C
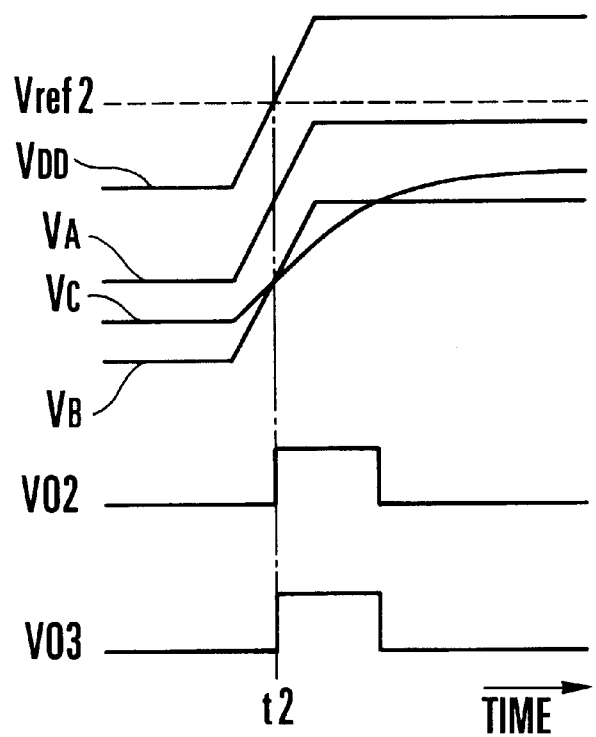
FIG. 3A
FIG. 3B
FIG. 3C

POWER SUPPLY VOLTAGE DETECTION DEVICE

BACKGROUND OF THE INVENTION

The present invention relates to a power supply voltage detection device for detecting abrupt variations in power supply voltage due to external noise and the like in an apparatus such as a microcomputer.

A conventional apparatus such as a microcomputer malfunctions owing to abrupt variations in power supply voltage. For this reason, a power supply voltage detection circuit detects that the power supply voltage falls outside a rated range, and the apparatus is reset upon detection of a power supply voltage variation.

FIG. 6 shows a conventional power supply voltage detection circuit. Referring to FIG. 6, the power supply voltage detection circuit is constituted by a lower limit comparator 11 for detecting when a power supply voltage VDD becomes equal to or lower than a rated lower limit Vref1, an upper limit comparator 12 for detecting when the power supply voltage VDD becomes equal to or higher than a rated upper limit Vref2, an AND gate 13 for ANDing an output VO11 from the lower limit comparator 11 and an output VO12 from the upper limit comparator 12, and resistors R11 and R12.

A reference voltage Vref1' input to the lower limit comparator 11 and a reference voltage Vref2' input to the upper limit comparator 12 are set with respect to the rated lower limit Vref1 and the rated upper limit Vref2 of the power supply voltage VDD as follows:

$$Vref1'=Vref1 \times R12/(R11+R12)$$

$$Vref2'=Vref2 \times R12/(R11+R12)$$

The operation of the power supply voltage detection circuit having the above arrangement will be described with reference to FIGS. 7A to 7D. Referring to FIG. 7A, when the power supply voltage VDD abruptly drops to become equal to or lower than the rated lower limit Vref1 owing to external noise or the like, the output VO11 from the lower limit comparator 11 is set at "L" level (Low level), as shown in FIG. 7B. As a result, an output VO13 from the AND gate 13 is also set at "L" level.

When the power supply voltage VDD abruptly rises to become equal to or higher than the rated upper limit Vref2, the output VO12 from the upper limit comparator 12 is set at "L" level, as shown in FIG. 7C. As a result, the output VO13 from the AND gate 13 is also set at "L" level, as shown in FIG. 7D. That the power supply voltage VDD becomes equal to or lower than the rated lower limit Vref1 or equal to or higher than the rated upper limit Vref2 can be detected in this manner.

Some apparatus such as a microcomputer operates in a wide operating voltage range and can be used with a plurality of power supply voltage ratings (e.g., operable at power supply voltages VDD of 5 V, 3 V, . . .). Obviously, in this case, when the power supply voltage VDD is changed, the rated lower limit Vref1 and the rated upper limit Vref2 also vary accordingly.

In the conventional power supply voltage detection circuit, however, the reference voltage Vref1' for detecting when the power supply voltage VDD becomes equal to or lower than the rated lower limit Vref1 must be applied, together with the reference voltage Vref2' for detecting when the power supply voltage VDD becomes equal to or higher than the rated upper limit Vref2. For this reason, when the rating of the power supply voltage VDD changes, the reference voltages Vref1' and Vref2' must be set again in accordance with the rated lower limit Vref1 and the rated upper limit Vref2.

Although this circuit is designed to detect abrupt variations in power supply voltage due to external noise and the like, the circuit also detects moderate variations in power supply voltage (the output VO13 from the AND gate 13 is set at "L" level) during a power-on period (a period PON in FIGS. 7A to 7D) or power-off period.

SUMMARY OF THE INVENTION

It is an object of the present invention to provide a power supply voltage detection device in which the reference voltages need not be re-generated in accordance with the power supply voltage.

It is another object of the present invention to provide a power supply voltage detection device which can detect only abrupt variations in power supply voltage due to external noise and the like.

In order to achieve the above objects, according to the present invention, there is provided a power supply voltage detection device comprising reference voltage generating means for generating lower and upper limit reference voltages by resistance-dividing a power supply voltage, integrator means for integrating comparative voltages extracted by resistance-dividing the power supply voltage, lower limit comparison means for comparing the lower limit reference voltage from the reference voltage generating means with an output voltage from the integrator means to detect when the power supply voltage becomes equal to or less than a lower limit, and upper limit comparison means for comparing the upper reference voltage from the reference voltage generating means with an output voltage from the integrator means to detect when the power supply voltage becomes equal to or greater than an upper limit.

BRIEF DESCRIPTION OF THE DRAWINGS

FIG. 1 is a block diagram showing a power supply voltage detection circuit according to an embodiment of the present invention;

FIGS. 2A to 2C are timing charts showing the operation of the power supply voltage detection circuit in FIG. 1 when the power supply voltage drops;

FIGS. 3A to 3C are timing charts showing the operation of the power supply voltage detection circuit in FIG. 1 when the power supply voltage rises;

DESCRIPTION OF THE PREFERRED EMBODIMENT

Figures 4A, 4B, 4C, 4D:
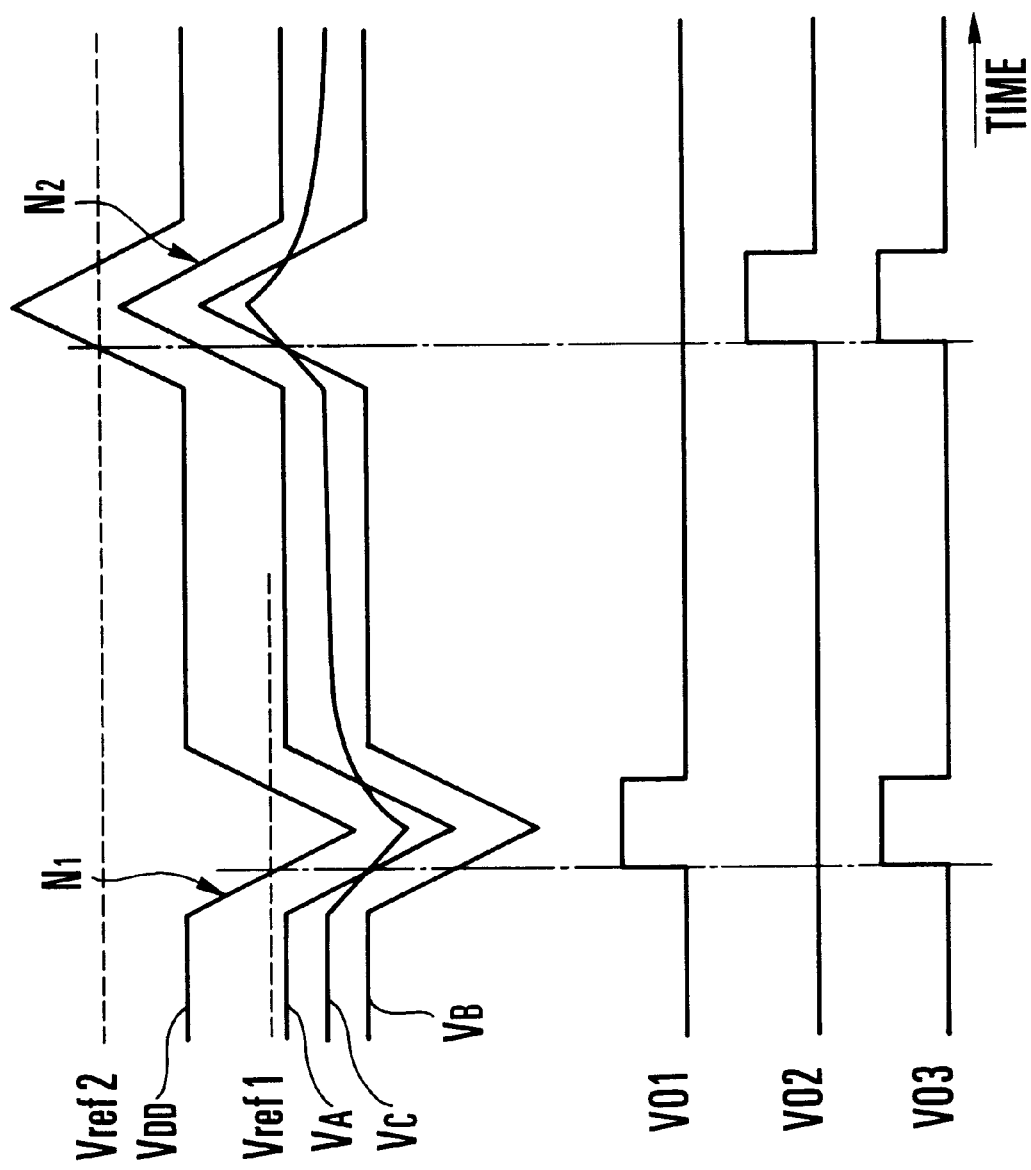
FIGS. 4A to 4D are timing charts showing the operation of the power supply voltage detection circuit in FIG. 1 when external noise is superimposed on the power supply voltage.

The present invention will be described in detail below with reference to the accompanying drawings.

FIG. 1 shows a power supply voltage detection circuit according to an embodiment of the present invention. Referring to FIG. 1, the power supply voltage detection circuit is constituted by a lower limit comparator 11 for detecting when a power supply voltage VDD becomes equal to or lower than a rated lower limit Vref1, an upper limit comparator 12 for detecting when the power supply voltage VDD becomes equal to or higher than a rated upper limit Vref2, an OR gate 13 for ORing an output VO1 from the lower limit comparator 11 and an output VO2 from the upper limit comparator 12, a reference voltage generating circuit 14 for generating a lower limit reference voltage, an upper limit reference voltage, and a divided voltage by resistance-dividing the power supply voltage VDD, and an integrator circuit for integrating the divided voltage output from the reference voltage generating circuit 14 and outputting the resultant voltage to the lower limit comparator 11 and the upper limit comparator 12.

The lower and upper limit reference values output from the reference voltage generating circuit 14 are respectively output to the lower limit comparator 11 and the upper limit comparator 12. Each of the lower limit comparator 11 and the upper limit comparator 12 is constituted by an operational amplifier having an inverting input terminal and a non-inverting input terminal.

The reference voltage generating circuit 14 is constituted by resistors R1 to R4 for resistance-dividing the power supply voltage VDD. A node A of the resistors R1 and R2 is connected, as a point at which a reference voltage VA is generated, to the inverting input terminal of the lower limit comparator 11. A node B of the resistors R3 and R4 is connected, as a point at which a reference voltage VB is generated, to the non-inverting input terminal of the upper limit comparator 12. The integrator circuit 15 is constituted by a resistor R5 and a capacitor C1. The integrator circuit 15 integrates the voltages at the node of the resistors R2 and R3, and supplies the integral output generated at a point C to the non-inverting input terminal of the lower limit comparator 11 and the inverting input terminal of the upper limit comparator 12.

When the value of the resistor R3 is set to be larger than that of the resistor R5, the relationship between the power supply voltage VDD, the reference voltages VA and VB, and a voltage VC at the point C is expressed as

VDD>VA>VC>VB

The operation to be performed when the power supply voltage VDD abruptly drops will be described next with reference to FIGS. 2A to 2C. When the power supply voltage VDD which has been set in the range of the rated lower limit Vref1 to the rated upper limit Vref2 abruptly drops, the reference voltages VA and VB at the points A and B and the voltage VC at the point C also drop accordingly. At this time, the voltage VC at the point C drops more moderately than the reference voltage VA at the point A because the capacitor C1 is discharged. At time t1, the relationship in magnitude between the reference voltage VA at the point A and the voltage VC at the point C is reversed, and the voltage VC becomes higher than the reference voltage VA.

With this operation, the output VO1 from the lower limit comparator 11 is set at "H" level, as shown in FIG. 2B, and an output VO3 from the OR gate 13 is also set at "H" level, as shown in FIG. 2C. As a result, that the power supply voltage VDD becomes equal to or lower than the rated lower limit Vref1 can be detected from the output VO3 from the OR gate 13 which has changed to "H" level.

The operation to be performed when the power supply voltage VDD abruptly rises will be described next with reference to FIGS. 3A to 3C. As shown in FIG. 3A, when the power supply voltage VDD which has been set in the range of the rated lower limit Vref1 to the rated upper limit Vref2 abruptly rises, the reference voltages VA and VB at the points A and B and the voltage VC at the point C also rise accordingly. At this time, the voltage VC rises more moderately than the reference voltage VB at the point B because the capacitor C1 is charged. At time t2, the relationship in magnitude between the reference voltage VB at the point B and the voltage VC at the point C is reversed, and the voltage VC becomes lower than the reference voltage VB.

With this operation, the output VO2 from the upper limit comparator 12 is set at "H" level, as shown in FIG. 3B, and the output VO3 from the OR gate 13 is also set at "H" level, as shown in FIG. 3C. As a result, that the power supply voltage VDD becomes equal to or higher than the rated upper limit Vref2 can be detected from the output VO3 from the OR gate 13 which has changed to "H" level.

The operation to be performed when external noise is applied to the power supply voltage VDD is the same as that shown in FIGS. 2A to 2C and 3A to 3C. More specifically, the operation to be performed when external noise N1 in FIG. 4A is superimposed is the same as that to be performed when the power supply voltage VDD abruptly changes (drops) below the time constant, at the time of discharging, which is determined by the resistors R3 to R5 and the capacitor C1. In this case, as shown in FIGS. 4B and 4D, both the output VO1 from the lower limit comparator 11 and the output VO3 from the OR gate 13 are set at "H" level.

The operation to be performed when external noise N2 in FIG. 4A is superimposed is the same as that to be performed when the power supply voltage VDD abruptly changes (rises) beyond the time constant, at the time of charging of the capacitor C1, which is determined by the resistors R1, R2, and T5 and the capacitor C1. In this case, as shown in FIGS. 4C and 4D, both the output VO2 from the upper limit comparator 12 and the output VO3 from the OR gate 13 are set at "H" level.

FIGS. 2A to 2C, 3A to 3C, and 4A to 4D show cases wherein 1/ω (ω=2πf; f is the frequency) is smaller than the time constant.

Figure 5:
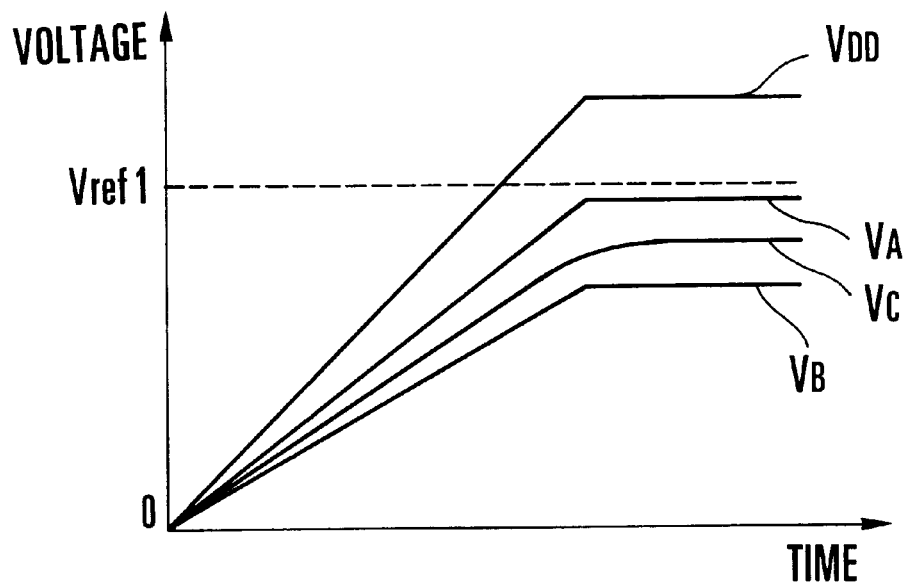
FIG. 5 is a graph of the voltage characteristics of the power supply voltage detection circuit in FIG. 1, showing its operation during a power-on period.
Figure 6:
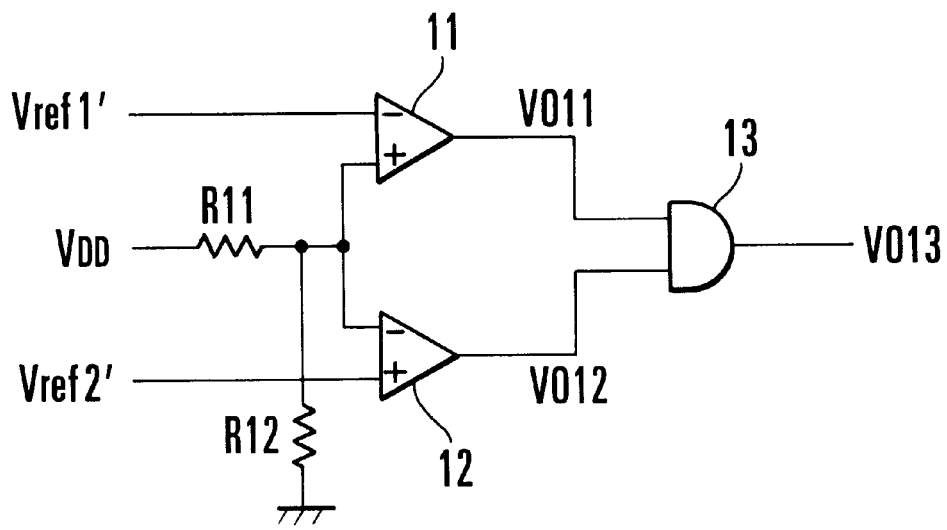
FIG. 6 is a block diagram showing a conventional power supply voltage detection circuit.
Figures 7A, 7B, 7C, 7D:
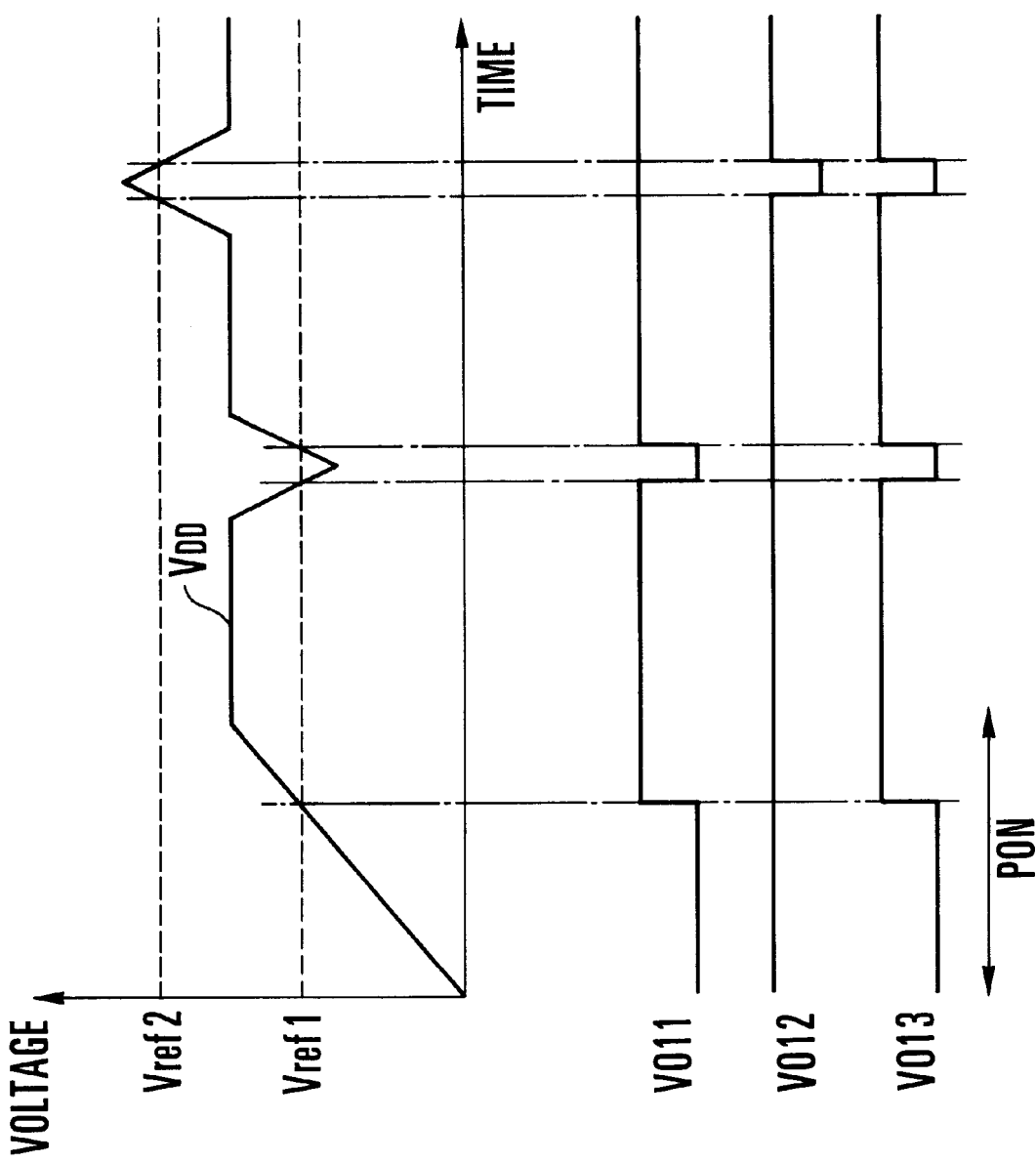
FIGS. 7A to 7D are timing charts showing the operation of the conventional power supply voltage detection circuit.

FIG. 5 shows the operation to be performed when the power supply voltage VDD moderately changes. Referring to FIG. 5, when the power supply voltage VDD moderately rises, since the relationship in magnitude between the voltage VC and the reference voltage VA or VB is not reversed, both the outputs VO1 and VO2 from the upper limit comparators 11 and 12 are kept at "L" level. Consequently, the output VO3 from the OR gate 13 is also kept at "L" level. A similar operation is performed when the power supply voltage VDD moderately drops.

A time constant is set in the charger/discharger circuit constituted by the resistors R1 to R5 and the capacitor C1 such that the relationship in magnitude between the voltage VC and the reference voltage VA or VB is reversed when the power supply voltage VDD abruptly changes to become equal to or lower than the rated lower limit Vref1 or become equal to or higher than the rated upper limit Vref2 owing to noise or the like. At the same time, a time constant is set such that the above relationship in magnitude between the respective voltages does not change when the power supply voltage VDD moderately changes upon power-on or power-off operation. With this setting, only abrupt variations in the power supply voltage VDD can be detected.

In addition, the reference voltages VA and VB automatically vary in accordance with changes in power supply voltage ratings. Unlike in the conventional power supply voltage detection circuit, therefore, when the power supply voltage VDD is changed, the reference voltages need not be set again.

As has been described above, according to the present invention, since the degree of change in power supply voltage is determined by the time constant circuit, only abrupt variations in power supply voltage due to external noise and the like can be detected. In addition, since the upper and lower limit reference voltages are generated by resistance-dividing the power supply voltage, the reference voltages need not be set again in accordance with changes in power supply voltage ratings.

What is claimed is:

1. A power supply voltage detection device comprising:

reference voltage generating means for generating lower and upper limit reference voltages by resistance-dividing a power supply voltage;

integrator means for integrating comparative voltages extracted by resistance dividing the power supply voltage;

lower limit comparison means for comparing the lower limit reference voltage from said reference voltage generating means with an output voltage from said integrator means to detect whether the power supply voltage is below a lower limit; and upper limit comparison means for comparing the upper limit reference voltage from said reference voltage generating means with an output voltage from said integrator means to detect whether the power supply voltage is above an upper limit;

wherein said reference voltage generating means comprises first to fourth resistors connected in series between a power supply and ground, and the lower limit reference voltage is generated from a node connecting said first and second resistors, and the upper limit reference voltage is generated from a node connecting said third and fourth resistors;

wherein said reference voltage generating means generates a comparative voltage from a node connecting said second and third resistors, and outputs the comparative voltage to said integrator means.

2. A device according to claim 1, wherein said integrator means comprises:

a fifth resistor having one terminal connected to the node connecting said second and third resistors and the other terminal connected to each of input terminals of said lower and upper limit comparison means; and a capacitor having one terminal connected to the other terminal of said fifth resistor and the other terminal grounded.

3. A device according to claim 2, wherein said fifth resistor has a resistance lower than that of said third resistor.

4. A device according to claim 2, wherein said lower limit comparison means comprises an operational amplifier having an inverting input terminal connected to the node connecting said first and second resistors and a non-inverting input terminal connected to the other terminal of said fifth resistor, and said upper limit comparison means comprises an operational amplifier having an inverting input terminal connected to the other terminal of said fifth resistor and a non-inverting input terminal connected to the node connecting said third and fourth resistors.

5. A device according to claim 1, further comprising OR means for ORing outputs from said lower and upper limit comparison means to output a detection signal indicating an abrupt variation in power supply voltage.

6. A power supply voltage detection device comprising:

a reference voltage generator generating lower and upper limit reference voltages by resistance-dividing a power supply voltage;

an integrator integrating comparative voltages extracted by resistance-dividing the power supply voltage;

a lower limit comparator comparing the lower limit reference voltage from said reference voltage generator with an output voltage from said integrator to detect whether the power supply voltage is below a lower limit; and an upper limit comparator comparing the upper limit reference voltage from said reference voltage generator with an output voltage from said integrator to detect whether the power supply voltage is above an upper limit;

wherein said reference voltage generator generates a comparative voltage from a node connecting said second and third resistors, and outputs the comparative voltage to said integrator.

7. A device according to claim 6, wherein said lower limit comparator comprises an operational amplifier.

8. A device according to claim 6, further comprising an OR circuit for ORing outputs from said lower and upper limit comparators to output a detection signal indicating an abrupt variation in power supply voltage.

9. A power supply voltage detection device comprising:

reference voltage generating means for generating lower and upper limit reference voltages by resistance-dividing a power supply voltage;

integrator means for integrating comparative voltages extracted by resistance dividing the power supply voltage;

lower limit comparison means for comparing the lower limit reference voltage from said reference voltage generating means with an output voltage from said integrator means to detect whether the power supply voltage is below a lower limit;

upper limit comparison means for comparing the upper limit reference voltage from said reference voltage generating means with an output voltage from said integrator means to detect whether the power supply voltage is above an upper limit; and OR means for ORing outputs from said lower and upper limit comparison means to output a detection signal indicating an abrupt variation in power supply voltage;

wherein said reference voltage generating means comprises first to fourth resistors connected in series between a power supply and ground, and the lower limit reference voltage is generated from a node connecting said first and second resistors, and the upper limit reference voltage is generated from a node connecting said third and fourth resistors, wherein said reference voltage generating means generates a comparative voltage from a node connecting said second and third resistors, and outputs the comparative voltage to said integrator means;

wherein said integrator means comprises a fifth resistor having one terminal connected to the node connecting said second and third resistors and the other terminal connected to each of input terminals of said lower and upper limit comparison means, and a capacitor having one terminal connected to the other terminal of said fifth resistor and the other terminal grounded;

wherein said lower limit comparison means comprises an operational amplifier having an inverting input terminal connected to the node connecting said first and second resistors and a non-inverting input terminal connected to the other terminal of said fifth resistor;

wherein said upper limit comparison means comprises an operational amplifier having an inverting input terminal connected to the other terminal of said fifth resistor and a non-inverting input terminal connected to the node connecting said third and fourth resistors;

wherein the power supply voltage is supplied to a microcomputer.

* * * * *

UNITED STATES PATENT AND TRADEMARK OFFICE
CERTIFICATE OF CORRECTION

PATENT NO. : 6,118,295
DATED : September 12, 2000
INVENTOR(S) : Shingo Murayama, et al.

It is certified that error appears in the above-identified patent and that said Letters Patent is hereby corrected as shown below:

Column 3, line 13 after "circuit" insert --15--.

Signed and Sealed this

Twenty-ninth Day of May, 2001

Attest:

NICHOLAS P. GODICI

Attesting Officer     Acting Director of the United States Patent and Trademark Office